J. A. KEPKA.
LIQUID MEASURING DEVICE.
APPLICATION FILED MAR. 25, 1914.

1,152,952.

Patented Sept. 7, 1915.
2 SHEETS—SHEET 1.

Witnesses:

Inventor,
Josef A. Kepka
by
his Attorney

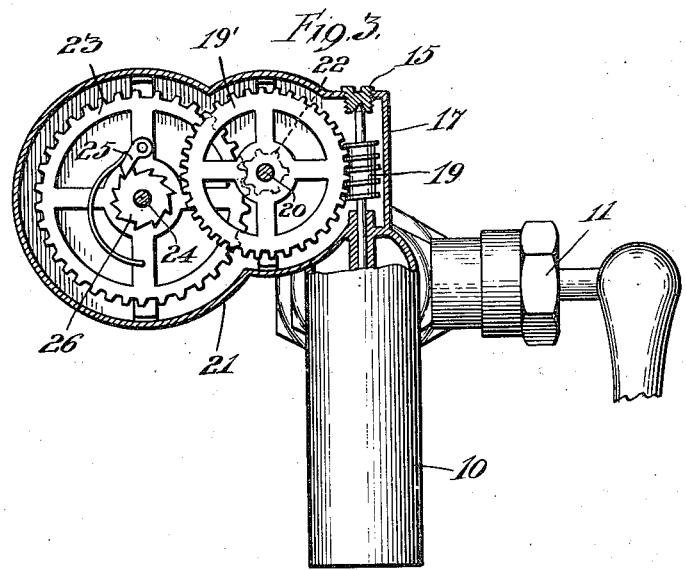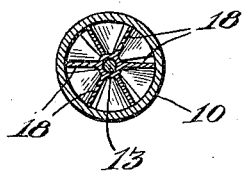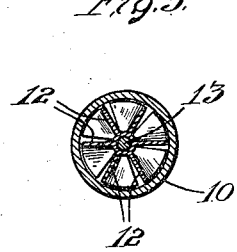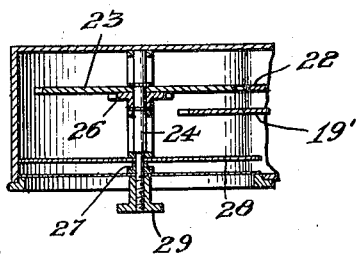

UNITED STATES PATENT OFFICE.

JOSEF A. KEPKA, OF CHICAGO, ILLINOIS.

LIQUID-MEASURING DEVICE.

1,152,952.     Specification of Letters Patent.     Patented Sept. 7, 1915.

Application filed March 25, 1914. Serial No. 827,066.

*To all whom it may concern:*

Be it known that I, JOSEF A. KEPKA, a former subject of the Emperor of Austria-Hungary, who have declared my intention of becoming a citizen of the United States, and a resident of the city of Chicago, county of Cook, and State of Illinois, have invented certain new and useful Improvements in Liquid-Measuring Devices, of which the following is a specification.

My invention relates to improvements in liquid measuring devices, and has for its object the production of a device of this character which will be of improved construction and efficient and accurate in operation.

Other objects will appear hereinafter.

The invention consists in the combinations and arrangements of parts hereinafter described and claimed.

Figure 1:
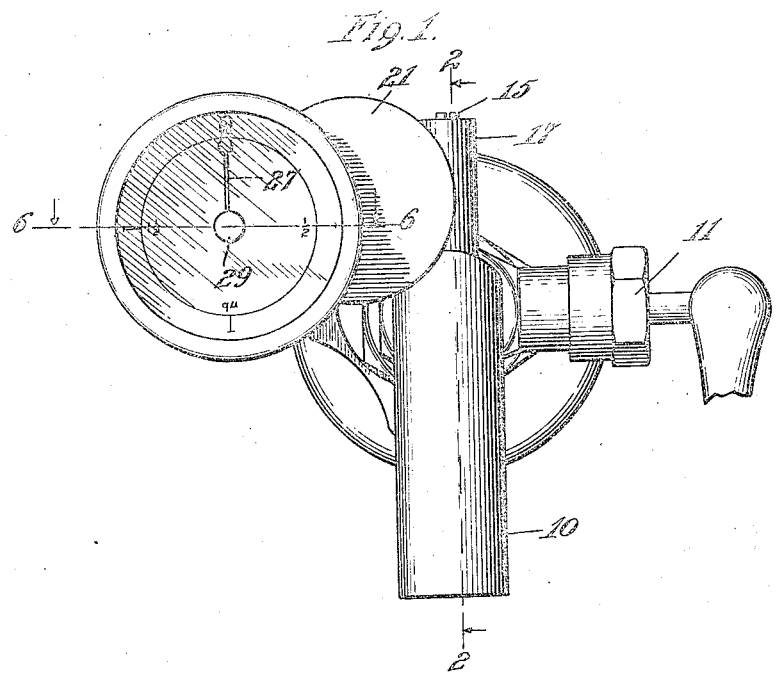
Figure 2:
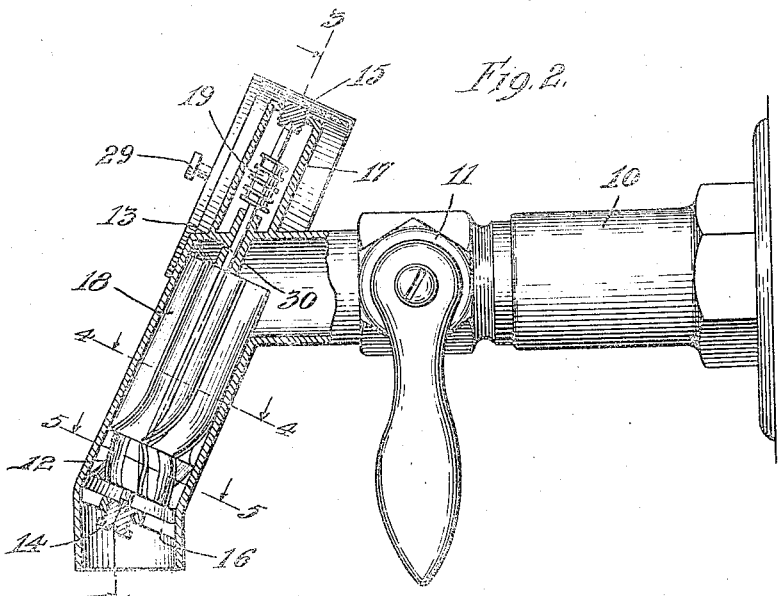

The invention will be best understood by reference to the accompanying drawings forming a part of this specification, and in which, Figure 1 is a front elevation of a liquid measuring device embodying my invention, Fig. 2 is a section taken on substantially line 2—2 of Fig. 1, Fig. 3 is a section taken on substantially line 3—3 of Fig. 2, Figs. 4 and 5 are sections taken on lines 4—4 and 5—5 respectively of Fig. 2, and Fig. 6 is a detail section taken on substantially line 6—6 of Fig. 1.

The preferred form of construction as illustrated in the drawings comprises a faucet consisting of a discharge pipe 10 and a manually adjustable valve or cock 11, the latter being equipped as shown with an exteriorly positioned handle whereby the same may be operated.

Arranged in the depending outer end of the discharge pipe 10 is a meter wheel 12 fixed to a carrying shaft 13. The respective ends of said shaft are conically formed for engagement with recessed bearing members 14 and 15 which are threaded respectively in a web 16 fixed in the lower end of pipe 10 and in the upper end of housing 17. By threading the bearing members 14 and 15 in position, adjustment is afforded whereby the same may be moved toward and from the ends of shaft 13 in order to permit of wear being taken up, or said bearing members being adjusted for any other reason to secure light running and thereby conduce to sensitiveness in the rotation of the meter wheel which is essential to accurate measuring.

Fixed in the upper end portion of the depending end of pipe 10 is a liquid deflecting or guiding element 18 consisting of a plurality of radially disposed blades. The lower end portions of said blades are curved or helically disposed, such curvature being in a direction opposite to that of the helically disposed blades of meter wheel 12 in order to deflect or direct the liquid passing through the device into effective engagement or impingement with the meter wheel blades, as will be readily understood. Also, with this arrangement, a plurality of smaller passages will be formed between the blades of element 18 which result in dividing the stream passing through the discharge pipe into an equal number of smaller streams which results in equally distributing the force of the stream against the various blades of the meter wheel and consequently in a more even and balanced operation of the latter.

Fixed to the upper end of shaft 13 in the housing 17 is a worm 19 which meshes with a worm wheel 19' fixed to a shaft 20 mounted in suitable bearings provided in housing 21. Also fixed to the shaft 20 is a pinion 22 which meshes with a gear 23 loosely mounted upon a shaft 24 the respective ends of which are rotatably mounted in suitable bearings provided in housing 21. Operative connection between the gear 23 and the shaft 24 is effected by means of a spring pressed pawl 25 carried by said gear which normally engages with a ratchet wheel 26 which is fixed to said shaft. With this arrangement, it will be seen, that upon positive rotation of the gear 23 such as is caused upon positive rotation of the meter wheel, the shaft 24 will be simultaneously rotated through the connection with said gear established by said pawl and ratchet mechanism. Also fixed to the shaft 24 is a hand or indicator 27 which coöperates with a graduated dial 28 arranged at the front side of housing 21, said graduations coöperating with the indicator 27 serving to indicate the quantity of liquid passed through the device, as will be readily understood. In using the device, when the desired quantity has been discharged from the faucet, as indicated by the finger 27, the flow is shut off by operation of the handle of valve 11.

Provided at the front end of the shaft 24 is an exteriorly positioned finger piece 29 through the medium of which said shaft may be adjusted, after operation of the device, to position indicator 27 at the zero point preparatory to a second liquid measuring operation. The pawl and ratchet connection between the gear 23 and the shaft 24 affords this adjustment, it being clear with this arrangement, that free manual rotation of said shaft in one direction is permitted.

At the point of the entry of shaft 13 into the housing 17, an elongated bearing 30 is provided which snugly embraces said shaft, serving to reinforce the same and at the same time preventing the entrance of liquid from the discharge pipe 10 into said housing. The absolute exclusion of liquid from said housing is important as otherwise the liquid so entering would interfere with the free operation of the worm and worm wheel, and gears, and thus defeat the element of accuracy in measuring which is the feature of greatest importance in the device.

While I have illustrated and described the preferred form of construction for carrying my invention into effect, this is capable of variation and modification without departing from the spirit of the invention, I, therefore, do not wish to be limited to the precise details of construction set forth, but desire to avail myself of such variations and modifications as come within the scope of the appended claims.

Having described my invention what I claim as new and desire to secure by Letters Patent is:-

1. A liquid measuring device comprising a liquid passage; a meter wheel rotatably mounted in said passage, the axis of said wheel being coincident with the axis of said passage, and the blades of said wheel being helically disposed; longitudinally extending deflector blades fixed in said passage, positioned rearwardly of said meter wheel, the major portion of said blades being straight and parallel with said passage and the lower end portions thereof being curved in a direction opposite to the direction of curvature of said meter wheel blades so as to direct the liquid passing through said passage into effective engagement with said meter wheel blades, substantially as described.

2. A liquid measuring device comprising a liquid passage; a meter wheel rotatably mounted in said passage, the axis of said wheel being coincident with that of said passage and the blades of said wheel being curved; deflector blades fixed in said passage positioned rearwardly of said meter wheel, said deflector blades being curved in a direction opposite to the direction of curvature of said meter wheel blades so as to direct the liquid passing through said passage int- effective engagement with said meter wheel blades; a shaft carrying said meter wheel; a bearing in the lower end of said passage for one end of said shaft, and a second bearing therefor arranged above said passage and out of communication therewith; a rotary indicator; and an operative connection between said shaft and said indicator, substantially as described.

3. A liquid measuring device comprising a liquid passage; a meter wheel rotatably mounted in said passage, the axis of said wheel being coincident with that of said passage and the blades of said wheel being curved; deflector blades fixed in said passage positioned rearwardly of said meter wheel, said deflector blades being curved in a direction opposite to the direction of curvature of said meter wheel blades so as to direct the liquid passing through said passage into effective engagement with said meter wheel blades; a shaft carrying said meter wheel; a bearing in the lower end of said passage for one end of said shaft, and a second bearing therefor arranged above said passage and out of communication therewith; a rotary indicator; an operative connection between said shaft and said indicator, said connection comprising a worm fixed to said shaft; a worm wheel meshing with said worm; and a train of gears interposed between said indicator and said worm wheel, substantially as described.

4. A liquid measuring device comprising a liquid passage; a meter wheel rotatably mounted in said passage adapted to be rotated by the liquid flowing through said passage; a rotary indicator; a train of gears operatively connected with said meter wheel; a pawl and ratchet connection between said gears and said indicator whereby the latter will be free for manual adjustment in one direction; and an exteriorly positioned finger piece for manually adjusting said indicator, substantially as described.

In testimony whereof I have signed my name to this specification in the presence of two subscribing witnesses.

JOSEF A. KEPKA.

Witnesses:
Joshua R. H. Potts,
Helen F. Lillis.